Aug. 25, 1964     G. C. SWEENEY     3,145,972
PORTABLE POWER FISH CABLE TOOL
Filed July 17, 1962     2 Sheets-Sheet 1
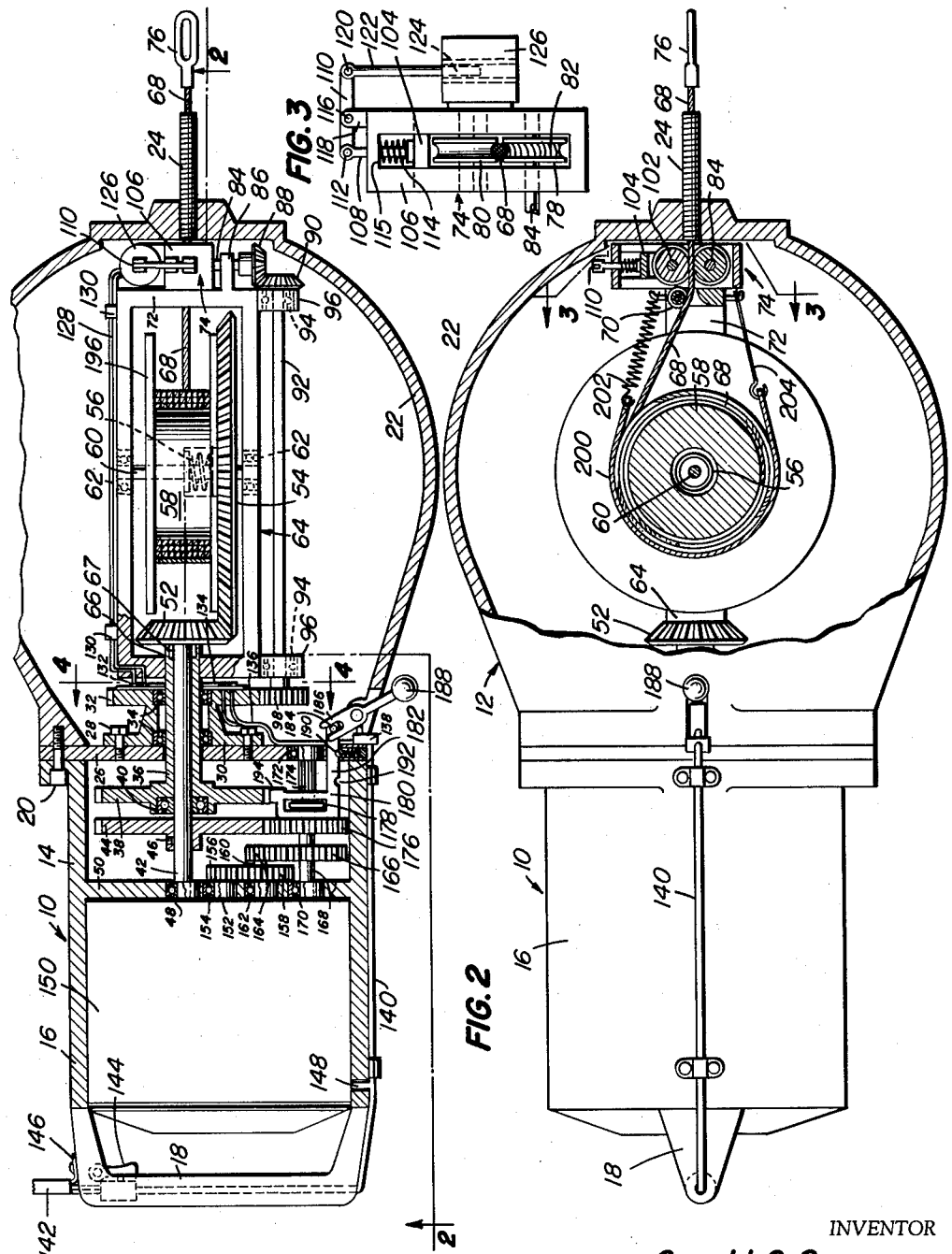
INVENTOR
*Gerald C. Sweeney*
BY
ATTORNEY Aug. 25, 1964  G. C. SWEENEY  3,145,972
PORTABLE POWER FISH CABLE TOOL
Filed July 17, 1962  2 Sheets-Sheet 2
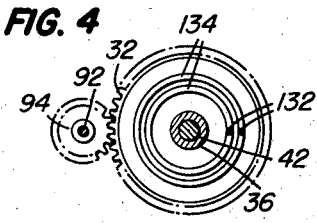
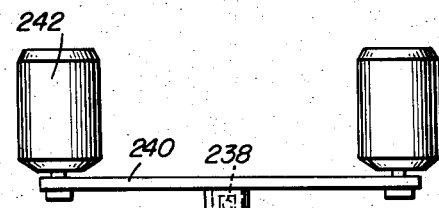
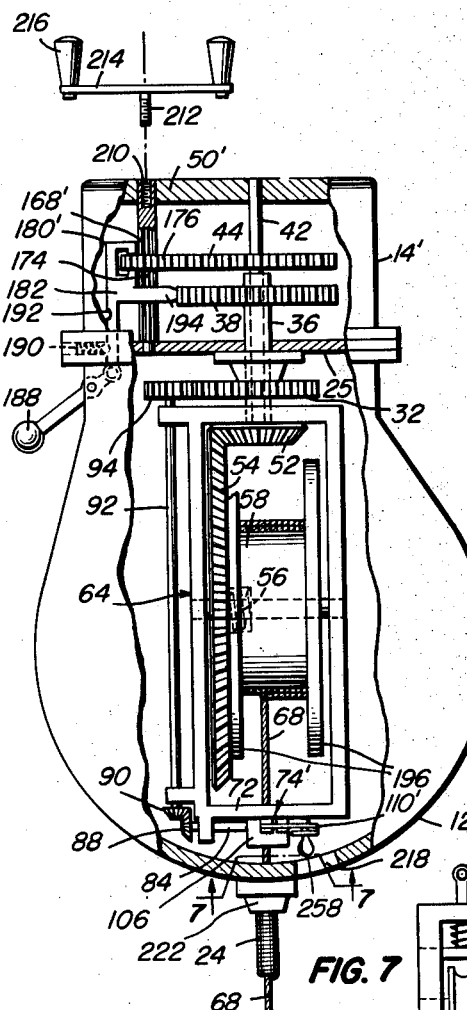
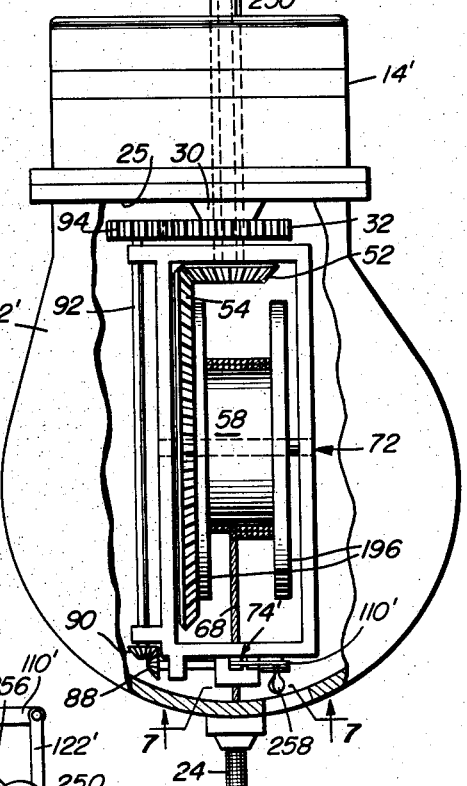
INVENTOR
Gerald C. Sweeney
BY Gustave Miller
ATTORNEY United States Patent Office 3,145,972
Patented Aug. 25, 1964

3,145,972
PORTABLE POWER FISH CABLE TOOL
Gerald C. Sweeney, 915 N. 15th St., Yakima, Wash.
Filed July 17, 1962, Ser. No. 210,328
16 Claims. (Cl. 254—134.3)

This invention relates to a portable power fish cable tool and has for an object to provide a tool for feeding a fish guide cable into a conduit for electric cables and for rotating the fish guide cable as it is fed into the conduit and subsequently securing an electric cable to the end of the fish guide cable in the conduit and then retracting the guide cable and attached electric cable from the conduit.

A further object of this invention is to provide a tool for feeding a fish guide cable into an electric cable conduit and simultaneously rotating it to facilitate the cable advancing around bends and curves in the conduit until the free end of the guide cable reaches the location of the end of an electric cable whereupon the electric cable may be attached to the free end of the guide cable and the fish guide cable may be retracted from the conduit to thus draw the electric cable through the conduit.

A still further object of this invention is to provide a fish cable tool to power feed a fish guide cable through the electric conduit, along with a turning or rotating action to keep the guide cable from lodging or getting stuck in bends or joints in conduit runs, then the guide cable reaches an outlet or junction box in the conduit run, electric cables or wires can be inserted through and secured to the end of the guide cable and subsequently the guide cable is retracted, pulling the electric cables or wires through the conduit. The most popular method today for fishing electric cables or wires through conduits is by means of a stiff steel flat tape wound on a reel by hand, if wound at all. Usually it is inserted then pulled out and often left laying with the result of a very tangled mess, quite often a broken fish tape. After the second bend, the procedure starts to slow down. By tapping with a hammer on subsequent bends, the tape may or may not be freed. However, if the conduit run is too long the joints may have to be taken apart or another tape pushed in from the opposite end in an attempt to hook the tapes together and much time is lost. With this invention, a fish guide cable is power fed into the conduit with a rotating or turning action about its axis so that it will more readily pass conduit joints and bends until its end reaches the desired location whereupon the electric cable or wire may be attached and then pulled through the conduit by the process of rewinding the fish guide cable on a reel drum.

Still a further object of this invention is to make a portable tool for this purpose wherein all the moving parts, such as shafts, gears, feeder rolls, bearings and parts taking a strain will be made of steel and the housing parts may be made of an aluminum alloy thus resulting in a unit tool small enough and light enough to be operated easily by a single man.

Still a further object of this invention is to provide a portable tool for simultaneously rotating and advancing a fish guide cable into a conduit and subsequently retracting it, wherein the power may be either electrically or manually provided.

With the above and related objects in view, this invention consists in the details of construction and combination of parts, as will be more fully understood from the following description, when read in conjunction with the accompanying drawings in which:

FIG. 1 is a partly sectional view of an electric motor form of the power fish cable tool of this invention.

FIG. 2 is a detailed sectional view on line 2—2 of FIG. 1.

FIG. 3 is a detailed view on line 3—3 of FIG. 2 of the cable feeder.

FIG. 4 is a detailed sectional view on line 4—4 of FIG. 1, showing the collector rings.

FIG. 5 is a partly fragmentary view of a hand operated form of this invention.

FIG. 6 is a partly fragmentary view of another hand operated form of this invention.

FIG. 7 is a view on lines 7—7 of FIGS. 5 and 6.

There is shown at 10 an electric motor powered form of this invention and consists of a housing generally shown at 12. The housing 12 includes a transmission housing section 14 and a motor housing section 16 to the end which a handle 18 is secured. Secured to the transmission housing 14 in any convenient manner, as by bolts 20, is a reel drum assembly housing section 22 from the end of which extends a narrow flexible externally insulated housing 24.

A wall plate 26 is secured by the same bolts 20 between the transmission housing section 14 and the reel drum assembly housing section 22. Secured to this wall plate 26 as by studs 28 is a nose cone 30 to which is secured either integrally or otherwise a stationary gear 32. Journaled in bearings 34 is a hollow shaft 36 provided with a gear 38 within the transmission housing section 14. Concentrically journaled in bearings 40 through the gear 38 and the hollow shaft 36 is a solid shaft 42 having a gear 44 secured thereto as by such screw 46, the end of the inner concentric shaft 42 being journaled in bearings 48 in the transmission housing wall 50.

The other end of the solid inner concentric shaft 42 has mounted thereon a bevel gear 52 which is meshed with another bevel gear 54 which is secured by means of slip clutch 56 to a reel drum 58. Reel drum 58 has an axle 60 mounted at 62 in a reel drum assembly bed 64, the reel drum assembly bed 64 being fixedly secured to the end of the hollow shaft 36 as by spot welding or the like at 66, a needle bearing 67 being provided in the end of hollow shaft 36 for the end of the inner concentric solid shaft 42 on which the bevel gear 52 is mounted.

A fish guide cable 68 is wound around and secured at one end to the reel drum 58, the other end of the cable 68 extending over a roller 70, mounted in the end of crossbar 72 of the rectangular assembly bed 64, and passing through an opening therein to pass through guide cable feeder generally shown at 74 and on an enlarged scale in FIG. 3. Beyond the feeder 74, the cable 68 passes through the flexible externally insulated housing 24 and terminates in a free end in an eye 76 to which an electric cable or electric wires may be readily attached.

The guide cable feeder 74 consists of a pair of gripping pulleys 78 and 80. One of the pulleys, such as the pulley 78, is provided with a friction increasing serrated surface 82 although obviously this friction increasing surface may be provided on the other pulley instead or on both pulleys as desired. The pulley 78 is fixed in position and is fixedly mounted on shaft 84 which extends through an ear 86 secured on assembly bed bar 72 and provided at its end with a small bevel gear 88 meshed with a second bevel 90 on the end of a shaft 92 journaled through bearings 94 provided in ears 96 at each end of the assembly bed 64, the shaft 92 at its other end being provided with a spur gear 98 in mesh with the stationary gear 32 on the nose cone 30.

Obviously, rotation of hollow shaft 36 by its gear 38 will cause the assembly bed 64 to rotate about the axis of the hollow shaft 36, which is coincidental with the axis of the solid shaft 42, and causing gear 98 to rotate as it travels about the gear 32 thereby causing shaft 92 to transmit rotation through the bevel gears 90 and 88 through the shaft 84 on which pulley 78 is fixed. The other pulley 80 is journaled on an axle 102 whose ends are attached to a frame 104 slidably mounted in a bracket 106 secured on the end of bar 72 of assembly bed 64.

An arm 108 is secured at one end to the slidable frame 104 and at its other end has a lever 110 pivoted thereto at 112. A coil spring 114 is provided around the arm 108 between the slidable frame 104 and the wall 115 of the bracket 106 to yieldably urge the pulley 80 against the cable 68 and grip it between the two pulleys 78 and 80. The lever 110 is pivoted at a mid point 116 to a fulcrum member 118 and at its end is pivotally secured at 120 to a link 122 terminating in an armature 124 extending into a solenoid 126. When the solenoid 126 is actuated it pulls in the armature 124 and through link 122 and lever 110 withdraws the pulley 80 against the yieldable resistance of coil spring 114 to release the pulleys from gripping action on the cable 68 passing therebetween, the cable 68 as it passes between the pulleys and into the flexible insulated housing 24 being axially aligned with the axis of the shafts 36 and 42 and the axis of rotation of the assembly bed 64.

In order to actuate the solenoid 126, it is connected by circuit wires 128 mounted at 130 on the assembly bed 64 and connected by brushes 132 to collector rings 134 mounted on the body of stationary gear 32. Circuit wires 136 connect the collector rings 134 through a switch 138 and circuit wires 140 to a power cable 142 secured to the handle 18, the handle 18 being provided with a switch 144 between the power cable 142 and the circuit wires 140. The power cable 142 is preferably a 3-wire cable with a grounding wire 146 secured to the housing 12 through the handle 18.

The circuit wires 140 also feed power at 148 to the motor 150 within the motor housing section 16. A shaft 152 from the electric motor 150 is journaled through bearings 154 in the wall 50 and has a spur gear 156 affixed thereto in mesh with another spur gear 158 provided with a shaft 160 journaled in bearings 162 in the wall 50 and having a small spur gear 164 affixed at its end, which gear 164 is in mesh with another spur gear 166 on a shaft 168 which is journaled in bearings 170 in wall 50 and bearings 172 in wall 26. Slidably mounted on splines 174 on the shaft 168 is a slide gear 176. The slide gear 176 is provided with an offset annulus 178 located within a gear shifting cage 180 fixed on the end of a shifting bar 182 which extends through the wall 26 and is provided with a pin 184 extending into the crotch end 186 of a control lever 188. A spring detent 190 cooperates with detents 192 in the gear shift lever 182 for releasibly locking the slide gear 176 in mesh with either gear 44 on the solid shaft 42 or gear 38 on the hollow shaft 36. In addition, a gear locking tooth 194 on the gear shift cage 180 is so positioned with relation to the slidable gear 176 that when the slidable gear 176 is in mesh with gear 44, the gear locking tooth 194 enters in between and locks the gear teeth of gear 38, thus preventing rotation of gear 38 and simultaneously preventing the assembly bed 64 from rotating while gear 44 and its bevel gears 52 and 54 are rotating the reel drum 58. Also, the switch 138 in the circuit to the solenoid 126 is so actuated by the gear shift lever 188 as to complete the circuit to the solenoid 126 only when slide gear 176 is in mesh with the gear 44 that rotates the reel drum 58 in the direction in which it is pulling the guide fish cable 68 into the housing and winding it on the reel drum 58, the solenoid 126 thus holding the pulleys away from their gripping position and letting the guide cable 68 wind onto the reel drum 58 between the flanges 196.

A friction band 200 is lightly held by a spring 202 and a hook 204 about an edge of the reel drum 58 to prevent the reel drum 58 from rotating too freely when the cable 68 is being pulled between the gripper pulleys 78 and 80 and fed exteriorly of the housing frame 12.

In the operation of fishing an electric cable or wires through the conduit the first problem is to get the fish through the conduit to the outlet box or junction box from which the electric wires are to be fed. This invention provides this function very satisfactorily. The gear shift lever 188 is shifted to the left from the position shown in FIG. 1 to shift the slide gear 176 on the spline portions 174 so as to mesh with the gear 38 which will rotate reel drum assembly bed 64 about the shafts as an axis. At the same time, switch 138 interrupts the circuit to the solenoid 126, so that pulleys 78 and 80 will grip guide cable 68. Rotation of the bed 64 causes the gear 98 to rotate about the stationary gear 32 and thus the shaft 92 and bevel gears 90 and 88 will rotate the gripping pulleys 70 and 78 to feed the guide fish cable 68 exteriorly through the externally insulated flexible housing 24 rotating the guide cable about its axis.

The free end of guide cable 68 provided with the hookeye 76 is inserted into an electric cable conduit and the motor 150 is operated, causing the guide cable to rotate and feed into the conduit. The rotation of the guide cable 68 as its feeds into the conduit causes it to readily advance through the conduit and prevents it from lodging in bends or joints in the conduit runs. This continuous turning action enables the hookeye 76 of the cable 68 to reach the desired junction box or outlet, and then the electric cables or wires to be fished therethrough are secured to the hookeye 76. The gear shift lever 188 is then moved to the right, this being to the position shown in FIG. 1 thereby causing the slide gear 176 to shift into mesh with gear 44 on the internal concentric solid shaft 42 and simultaneously causes the gear locking tooth 194 to mesh between two adjacent teeth of the gear 38 to prevent the assembly bed 64 from rotating about its axis.

At the same time the switch 138 is actuated to actuate solenoid 126 and separate the gripping pulleys 78 and 80 thereby permitting the cable 68 to pass freely therebetween and wind up on the reel drum 58 which is being rotated in a winding direction by the bevel gears 52 and 54 on solid shaft 42. Should the operator fail to release the switch 144 at the proper time, when the free hookeye 76 of the cable 68 is entirely withdrawn from the conduit, the slip clutch 56 will prevent damage as it will permit the reel 58 to slip even though the motor keeps operating. This is also true should the fish cable or electric cable get hung up in the conduit as the guide cable 68 is being rewound on the reel drum 58. The housing parts and walls would generally be made of aluminum alloy to provide lightness, the shafts, gears, feeder rolls, needle bearings and other moving parts, including the gripping rolls will be made of steel to provide strength, so that the entire unit will be small enough and light enough to be easily operated by one man. The flexible housing 24 is externally insulated to prevent liability of shock when the tool is being used in a junction box in which power may already be present.

Instead of the tool being electrically powered, it may be hand powered according to the forms shown in FIG. 5 and in FIG. 6. In each of these forms, the same reference numerals have been used where the parts in their operation are identical with the parts in operation of the electric power form shown in FIGS. 1 and 2. Where the parts are similar but not identical in construction, but are similar in function, the same reference numerals are used but with a prime attached thereto. In this case, in FIG. 5, power shaft 168' has a slide gear 176 mounted on splines 174 and operated in the same manner by the hand lever 188 between either gear 44 or 38. Operation of the solid shaft 42 rotates the bevel gears 52 and 54 to thereby rotate the reel drum 58 in a winding up direction for the guide cable 68. The power shaft 168' is journaled through an end wall 50' of housing 14' and is provided with a female thread 210 for receiving a threaded pin 212 of a crank handle 214 provided with handle knobs 216.

Inasmuch as no electricity is present in this form the solenoid of the electric power form is omitted and means for operating the lever 110' for moving the gripping pulleys away from each other which are located within the feeder 74′ is accessible through an opening 218 in the housing 12′.

The manual means for operating the cable gripper 74′ consists of the link 122′, pivoted at one end to the lever 110′, and pivoted at its other end at 250 to a cam wheel 252 eccentrically pivoted at 254 on an axis on a frame support 256 extending from the bracket 106′. A wing handle 258 extending at right angles from cam wheel 252 is readily accessible through the opening 218 in the housing 12′ for manual manipulation to rotate the cam wheel 252 over dead center and bring the stop 260 thereon into contact with the side of bracket 106. The cam wheel 252 thus being rotated over dead center, acts to hold the gripping pulleys 78 and 80 in non-gripping position, permitting cable 68 to be rewound on the reel drum 58. When the cable 68 is to be fed out of the housing off of the reel drum 58, the cam wheel 252 is rotated in the reverse direction, permitting the gripping pulleys 78 and 80 to grip and feed the cable 68 outwardly through flexible insulating housing 24. Obviously, a slight manipulation of the operating handles in FIGS. 5 or 6 may be necessary to bring the cam wheel 252 and its wing handle 258 to the position where it is accessible through the opening 218.

Other than the fact that the power shaft 168′ is manually rotated by the crank handle 214 and that the lever 110′ is manually operated to move the gripping pulleys away from each other, the operation of this form is identical with the electric powered form and the description of the non-electric parts of the powered form equally apply to this form.

In the manually operated form shown in FIG. 6, the hollow shaft 36′ has the same stationary gear 32 secured within reel drum and assembly bed housing 12′ and similarly the solid shaft 42′ concentric therewithin has the same bevel gear 52 at the inside end thereof in mesh with bevel gear 54 of reel drum 58. The other ends of shafts 36′ and 42′ do not have any gears. Instead, hollow shaft 36′ is provided with a projecting pin 230 adapted to be engaged by a hook 232 formed in a sleeve 234 slidable on the shaft 42, an internal hook 236 in sleeve 234 being selectively engageable with projecting on the end of shaft 42′. The sleeve 234 is secured to crack handle 240 which is rotatable by means of a handle knob 242 by manual power. As will be apparent, the hook portions 232 and 236 are reversed relative to each other so that by moving the crank handle 240 in one direction it may be readily disengaged from whichever pin 230 or 238 that it is engaged with and slid axially of shaft 42′ to engage the other pin for rotating the selected shaft 36′ or 42′.

The feeder mechanism 74′ in this form of the invention may be controlled by the same type of means for controlling lever 110′ accessible through opening 218 in the same manner as that described in connection with FIG. 5. In this form, as is apparent, no means is provided for locking the reel bed assembly against rotation about its axis while the reel drum 58 is rewinding the guide cable 68 but otherwise the operation of this form FIG. 6 is similar to the operation of the form of FIG. 5.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A portable cable tool for moving a cable through a conduit comprising a housing, a reel drum, a cable secured at one end to said reel drum and having an object securing free end portion exterior of said housing, a reel drum assembly rotatably mounted within said housing, said reel drum being rotatable mounted within said assembly, the axis of rotation of said assembly being normal to the axis of rotation of said reel drum, a cable feeder means mounted on said assembly for pulling said cable from said reel drum and feeding it exteriorly of said housing and through a conduit, the axis of rotation of said assembly passing through said feeder means, and selective means for operating said feeder means and rotating said assembly to simultaneously axially rotate said cable and feed it exteriorly of said housing, said selective means including means to release said cable from control by said feeder means and rotate said drum to wind up said cable thereon and move the object secured to said free end portion through a conduit, said reel drum assembly comprising an assembly bed, a drum axle mounted on said bed, a driven bevel gear secured to said drum, a driving bevel gear meshed with said driven bevel gear, a shaft axially aligned with the axis of rotation of said assembly, said driving bevel gear being mounted on said shaft, a hollow shaft concentric about said driving bevel gear shaft, a stationary gear concentric with both said shafts fixedly mounted on said housing, said assembly bed being secured to said hollow shaft, a transmission shaft journaled on said assembly bed having a gear at one end meshing with said stationary gear and meshed bevel gears at the other end operatively connected to one of said feeder means, said selective operating means being connectible to either of said concentric shafts.

2. The tool of claim 1, said selective operating means comprising a sleeve slidably mounted on said driving bevel gear shaft, means on each of said shafts for selectively connecting said sleeve to either shaft, and crank handle means for rotating said sleeve.

3. The tool of claim 1, said selective operating means comprising a separate gear on each of said concentric shafts, a drive spur gear selectively meshable with either shaft, and a splined drive shaft for said spur gear.

4. The tool of claim 3, and selector means for shifting said spur gear on said splined drive shaft to mesh with either shaft gear, and an assembly bed hollow shaft gear locking tooth on said selector means for locking said hollow shaft gear against rotation when said spur gear is in mesh with said other concentric shaft gear.

5. The tool of claim 4, and crank handle means secured to said splined shaft.

6. The tool of claim 4, and electric motor means geared to said splined shaft, said feeder means pulley moving means including solenoid means, a circuit to said solenoid means, and switch means in said solenoid means circuit operable by said gear selector means actuating said solenoid to disengage said feeder pulley when said reel drum gears are operatively connected to said splined shaft.

7. The tool of claim 1, and a slip clutch between said driven drum bevel gear and said reel drum.

8. The tool of claim 1, and friction band means limiting free rotation of said reel drum.

9. The tool of claim 1, and means for locking said reel drum assembly against rotation while winding up said guide cable on said drum.

10. The tool of claim 1, said cable feeder means comprising a pair of spaced pulleys positioned for frictionally gripping said cable therebetween, means for rotating one of said pulleys, and means for moving one of said pulleys to non-gripping position.

11. The tool of claim 10, said pulley moving means comprising a lever operatively attached to positioning means for said latter one pulley.

12. The tool of claim 11, and adjustable yieldable means urging said pulleys to cable gripping position.

13. The tool of claim 12, and means linked to said lever for retracting said one latter pulley to non-gripping position.

14. The tool of claim 1, the cable secured to said tool cable being electrically conductive, and a readily flexible externally insulated cable housing on said tool housing through which said tool cable extends exteriorly of said tool housing.

15. The tool of claim 14, said insulated readily flexible insulated cable housing being at one end of said tool housing and a manual handle secured to said tool housing at its opposite end.

16. The tool of claim 15, an electric motor in said tool housing for operating said tool, an electric power supply to said motor extending through said handle, and a manually accessible electric switch mounted on said manual handle.

References Cited in the file of this patent

UNITED STATES PATENTS

| | | |
|---|---|---|
| 2,167,087 | Quick | July 25, 1939 |
| 2,210,300 | Magruder | Aug. 6, 1940 |
| 2,355,733 | Johnson et al. | Aug. 15, 1944 |
| 2,468,490 | Joseph | Mar. 15, 1945 |
| 2,488,039 | Sketchley | Nov. 15, 1949 |
| 2,917,762 | Xenis | Dec. 22, 1959 |